US012734103B1

(12) United States Patent
Zhao

(10) Patent No.: US 12,734,103 B1
(45) Date of Patent: Sep. 15, 2026

(54) AIRFLOW-DRIVEN FLEXIBLE-PATTING MASSAGE ROD STRUCTURE

(71) Applicant: Dongguan Rijie Electronic Technology Co., Ltd., Dongguan (CN)

(72) Inventor: Quan Zhao, Dongguan City (CN)

(73) Assignee: Dongguan Rijie Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 19/458,992

(22) Filed: Jan. 26, 2026

(51) Int. Cl.
*A61H 19/00* (2006.01)
*A61H 23/00* (2006.01)
*A61H 23/02* (2006.01)

(52) U.S. Cl.
CPC ............. *A61H 19/32* (2013.01); *A61H 19/44* (2013.01); *A61H 23/006* (2013.01); *A61H 23/0254* (2013.01); *A61H 2201/1215* (2013.01); *A61H 2201/1246* (2013.01); *A61H 2201/14* (2013.01); *A61H 2201/1463* (2013.01); *A61H 2201/165* (2013.01); *A61H 2205/087* (2013.01)

(58) Field of Classification Search
CPC ........ A61H 19/00; A61H 19/30; A61H 19/32; A61H 19/34; A61H 19/40; A61H 19/44; A61H 19/50; A61H 23/00; A61H 23/004; A61H 23/02; A61H 23/0254; A61H 23/0263; A61H 2023/0272; A61H 2023/0281; A61H 2201/1215; A61H 2201/1246; A61H 2201/14; A61H 2201/1463; A61H 2201/165; A61H 2205/087
See application file for complete search history.

(56) References Cited

U.S. PATENT DOCUMENTS 12,383,457 B1 8/2025 Zhao et al.

*Primary Examiner* — Carrie R Dorna
(74) *Attorney, Agent, or Firm* — Rondaus PLLC; George Liu

(57) ABSTRACT

The present disclosure discloses an airflow-driven flexible-patting massage rod structure, includes a rotating device, a driving seat, a guiding seat, a telescopic seat, and a sealing seat; the rotating device is provided with a driving shaft; the rotating device is provided with a positioning shell extending upward; the positioning shell extends upward from a wall surface of the rotating device; the driving seat is connected to the driving shaft; an outer peripheral wall of the driving seat is provided with a closed-loop arc-shaped slot; a second guiding slot includes non-coplanar portions; the guiding seat is disposed in the lower chamber; the telescopic seat is provided with a pivotally disposed swing pin in the lower chamber; an end portion of the swing pin passes through the second guiding slot and then engages within the arc-shaped slot; an upper wall of the telescopic seat is further provided with an upper chamber.

20 Claims, 7 Drawing Sheets

AIRFLOW-DRIVEN FLEXIBLE-PATTING MASSAGE ROD STRUCTURE

TECHNICAL FIELD

The present disclosure relates to the field of adult products, and particularly to an airflow-driven flexible-patting massage rod structure.

BACKGROUND

Existing adult products typically use a combination of an air pump and a solenoid valve to achieve switching between positive and negative air pressure, thereby simulating a sucking motion of the human body or producing an action at a predetermined frequency. However, practical use has revealed that during the switching transition between positive and negative pressure, pauses or jamming in the motion frequently occur, which degrades the user experience. The process is not sufficiently linear. When jamming or pausing persists for an extended period, issues such as detachment of the flexible patting cup due to loss of suction are prone to occur.

Conventional solutions to this problem generally involve using an air pump with higher pressure to prevent detachment of the flexible patting cup during the switching transition. Correspondingly, the suction force is relatively large, failing to provide a satisfactory simulation of human body interaction.

SUMMARY

A primary objective of the present disclosure is to provide an airflow-driven flexible-patting massage rod structure, aiming to improve the existing driving structure for a flexible patting cup. The structure employs a linear-drive air pump, which can achieve switching between positive and negative air pressure without requiring additional components such as a solenoid valve. Furthermore, the switching transition is free from jamming issues.

To achieve the above objective, the present disclosure provides an airflow-driven flexible-patting massage rod structure, wherein the structure includes a rigid housing, a flexible sleeve, and a driving device;

the rigid housing is provided with an inner cavity, an upper portion of the rigid housing is provided with a flow diversion pipe, the rigid housing is provided with at least one recess, wherein the recess is provided with a flow diversion port, and the flow diversion pipe is in communication with the flow diversion port;

the flexible sleeve covers a peripheral wall of the rigid housing, the flexible sleeve covers the recess and forms an elastic portion, and the elastic portion and the rigid housing enclose a flow diversion cavity;

the driving device is disposed on the rigid housing, the rigid housing is provided with a lithium battery, a Printed Circuit Board (PCB) connected to the lithium battery, and a control device connected to the PCB, the driving device is connected to the PCB, and the control device is configured to control an operating state of the driving device;

the driving device includes a rotating device, a driving seat, a guiding seat, a telescopic seat, and a sealing seat;

the rotating device is provided with a driving shaft, the rotating device is provided with a positioning shell extending upward, the positioning shell is fixed to the rigid housing, the positioning shell extends upward from a wall surface of the rotating device, the positioning shell is located on an outer wall of the rotating device, and the positioning shell and an upper wall of the rotating device enclose a positioning cavity;

the guiding seat is fixedly mounted between the positioning shell and the rotating device, the guiding seat is provided with the inner cavity, the driving seat is disposed in the inner cavity, and the guiding seat is provided with a second guiding slot extending along a height direction of the guide seat;

the telescopic seat is provided with a lower chamber, the guiding seat is disposed in the lower chamber, the telescopic seat is provided with a pivotally disposed swing pin in the lower chamber, an end portion of the swing pin passes through the second guiding slot and then engages within an arc-shaped slot, and an upper wall of the telescopic seat is further provided with an upper chamber;

the sealing seat is fixedly disposed at a rear end of the flow diversion pipe, such that the flow diversion cavity is in communication with a sealing cavity;

when the rotating device rotates, the arc-shaped slot drives the swing pin to slide along a height direction of the second guiding slot;

the sliding of the swing pin drives the telescopic seat to move vertically between a position close to the sealing seat and a position away from the sealing seat;

the vertical movement of the telescopic seat causes a gas pressure between the upper chamber and the sealing cavity to switch between compression and release and adjusts a gas pressure of the flow diversion cavity; and when the gas pressure of the flow diversion cavity changes, the elastic portion deforms between an expanded position and a retracted position.

In practical design:

1. In practical design, the massage rod includes the rigid housing and a flexible sleeve covering the rigid housing; therefore, the massage rod is preferably strip-shaped (for example, having an elongated columnar structure, an elliptical columnar structure, or a spherical structure); the massage rod can be inserted into the vagina or positioned at the vaginal opening; during use, a driving device can control changes in air pressure within a sealed chamber, thereby applying predetermined stimulation to the vaginal wall; the stimulation can be an elastic tactile sensation from an elastic portion against the skin or a negative pressure suction sensation (which can be understood as flexible patting), thereby stimulating sensitive spots at different locations to obtain different experiences; concurrently, the user can experience the sensation of the massage rod simulating penile expansion.
2. The structure includes a positioning shell, a drive assembly (a rotating device, a driving seat, a guiding seat, and a telescopic seat), and a piston assembly (an upper chamber of the telescopic seat and a sealing seat); with the positioning shell as a carrier, the drive assembly and the piston assembly are configured as a modular structure, thereby facilitating installation, production, and assembly, while also providing greater stability and a smaller volume, which facilitates installing this structure within an adult product; through the cooperation between a second guiding slot and an arc-shaped slot, a rotary stroke is converted into a vertical stroke, thereby driving vertical movement of the upper chamber; the vertical movement of the upper chamber switches an air pressure between the sealing cavity and the upper chamber between compression and release, thereby achieving switching between positive and negative air pressure; furthermore, the switching process is more linear; this more linear switching process therefore provides a more linear drive to structures such as a flexible patting cup, thereby improving the simulation of the human body's flexible patting process, reducing issues such as jamming, and enhancing the user experience.

3. The improved air pump (i.e., the driving device) can have its rotational speed controlled by a control device to simulate different states; for example, a faster rotational speed results in a higher frequency of expansion and contraction, while a slower rotational speed can provide a gentler tactile sensation, and simultaneously, a faster rotational speed can also achieve a simulation of larger dimensions, with more linear transitions; furthermore, the driving device has higher durability; of course, user-selectable control modes can also be introduced to satisfy different intelligent control requirements.

Figure 1:
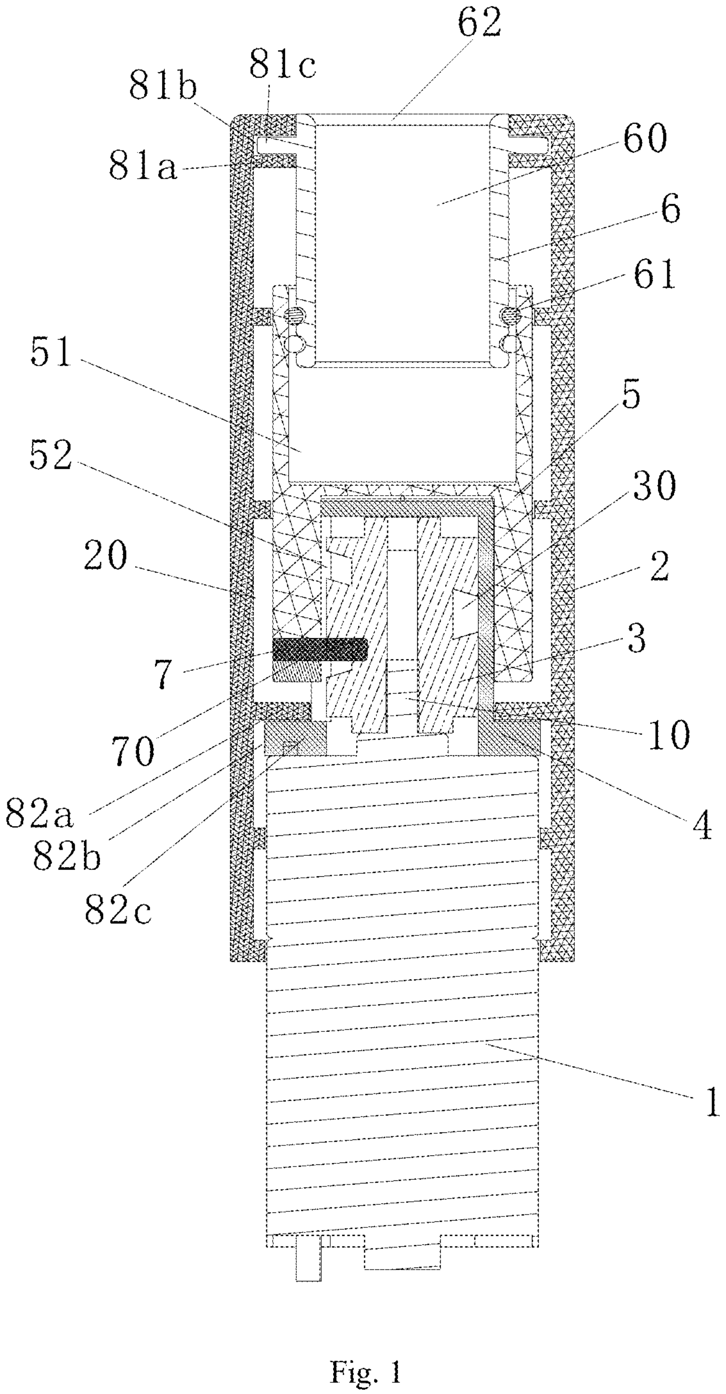
FIG. 1 is a perspective cross-sectional view of the present disclosure.

REFERENCE NUMERALS IN THE DRAWINGS 1. rotating device; 10. driving shaft; 11. rotating motor; 12. speed reduction device;
2. positioning shell; 20. positioning cavity;
3. driving seat; 30. first guiding slot; 31. ring-shaped slot; 31*a*. upward channel; 31*b*. downward channel; 32. non-circular shaft slot;
4. guiding seat; 40. inner cavity; 41. second guiding slot;
5. telescopic seat; 51. upper chamber; 52. lower chamber;
6. sealing seat; 60. sealing cavity; 61. sealing ring; 62. opening;
7. swing pin; 70. pivoting hole; 71. pivoting shaft; 72. arc-shaped portion; 73. notch; 74. positioning portion;

81*a*. first limiting portion; 81*b*. first limiting groove; 81*c*. first engaging portion;

82*a*. second limiting portion; 82*b*. second limiting groove; 82*c*. second engaging portion;

91. blocking portion; 92. inner chamfer;

100. guide hole; 101. telescopic portion;

200. flow diversion pipe; 201. flow diversion port; 202. groove;

300. soft housing; 301. first vibration motor; 302. second vibration motor; 303. side wing;

400. PCB; 401. control device;

500. rigid housing.

DETAILED DESCRIPTION OF THE EMBODIMENTS

The technical solutions in the embodiments of the present disclosure will be clearly and completely described below with reference to the accompanying drawings. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

It should be noted that if there are directional indications (such as up, down, left, right, front, back, top, bottom, inside, outside, vertical, transverse, longitudinal, counterclockwise, clockwise, circumferential, radial, axial . . . ), this directional indication is only used to explain the relative positional relationship, movement, etc. between the components in a specific posture (as shown in the accompanying drawings). If the specific posture changes, the directional indication also changes accordingly.

In addition, if there are descriptions involving "first" or "second" etc. in the embodiments of the present disclosure, the descriptions of "first" or "second" etc. are only for descriptive purposes and cannot be understood as instructions or implying its relative importance or implicitly specifying the quantity of the technical feature indicated. Therefore, features defined as "first" and "second" may explicitly or implicitly include at least one of these features. In addition, the technical solutions in various embodiments may be combined with each other, provided that such combinations are realizable by those skilled in the art. Where the combination of technical solutions is contradictory or unfeasible, it shall be deemed that such a combination does not exist and is not within the scope of protection required by the present disclosure.

Figure 2:
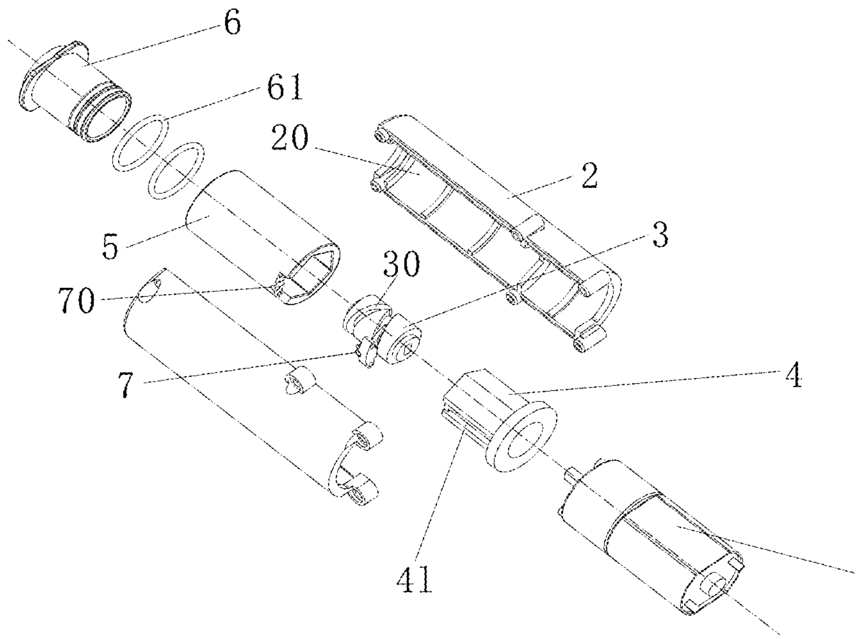
FIG. 2 is a first exploded view of the present disclosure.
Figure 3:
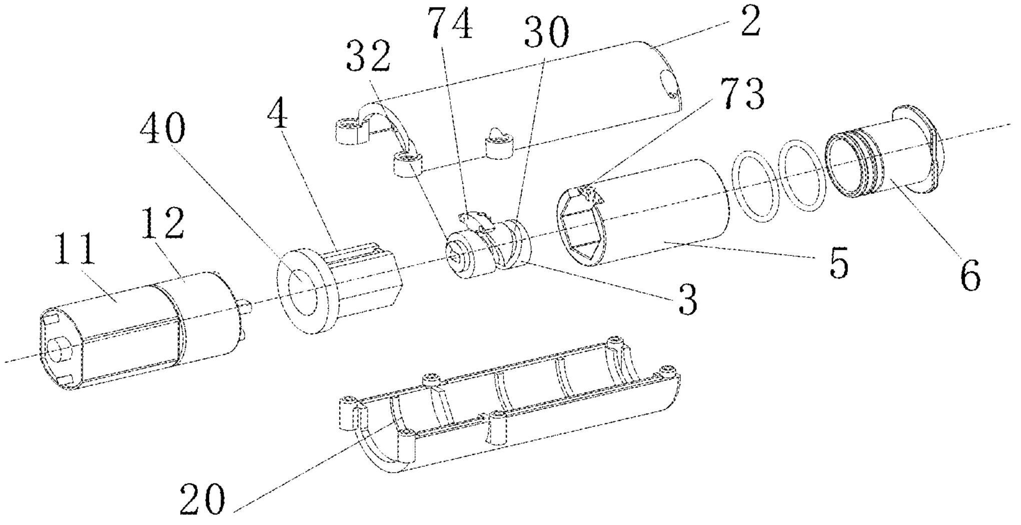
FIG. 3 is a second exploded view of the present disclosure.
Figure 4:
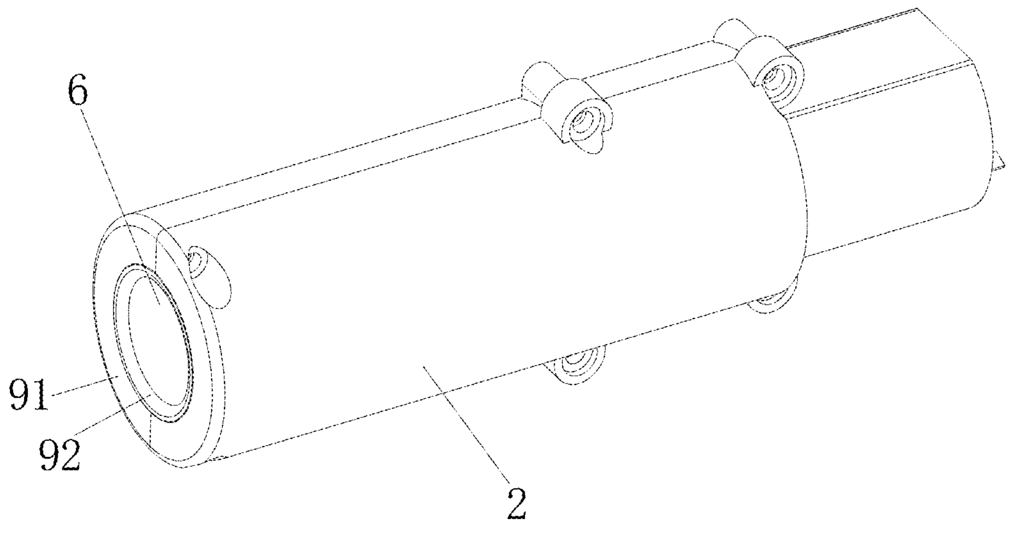
FIG. 4 is a perspective schematic view of the present disclosure.
Figure 5:
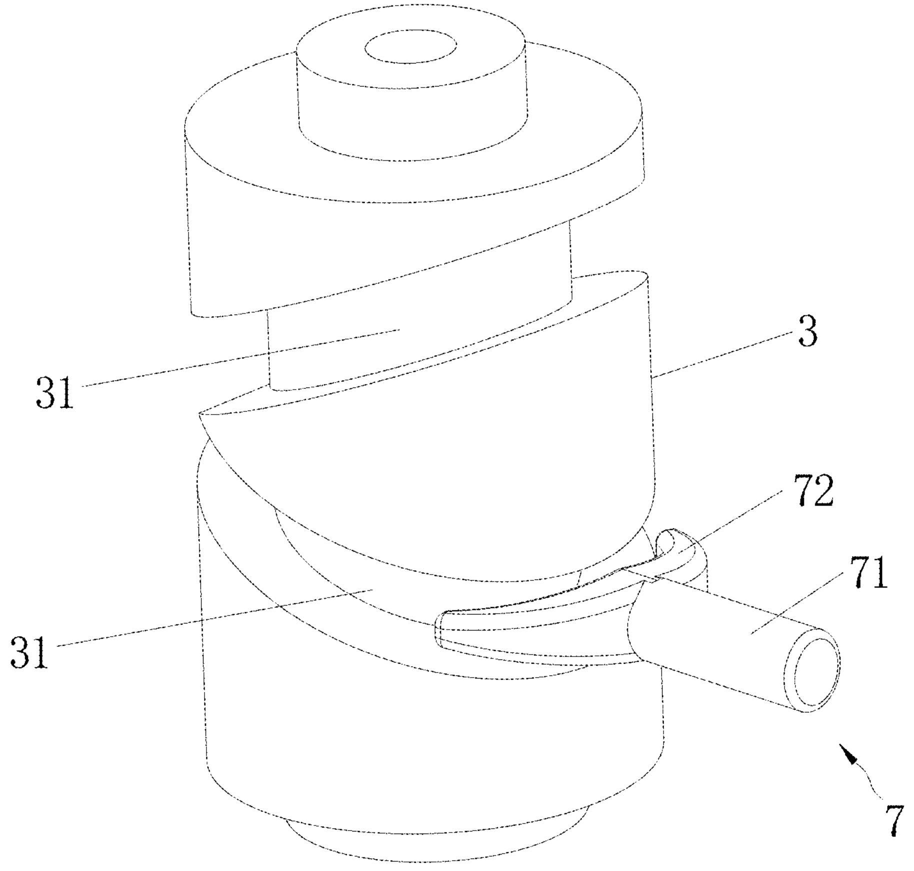
FIG. 5 is a schematic view showing the cooperation between a driving seat and a swing pin.
Figure 6:
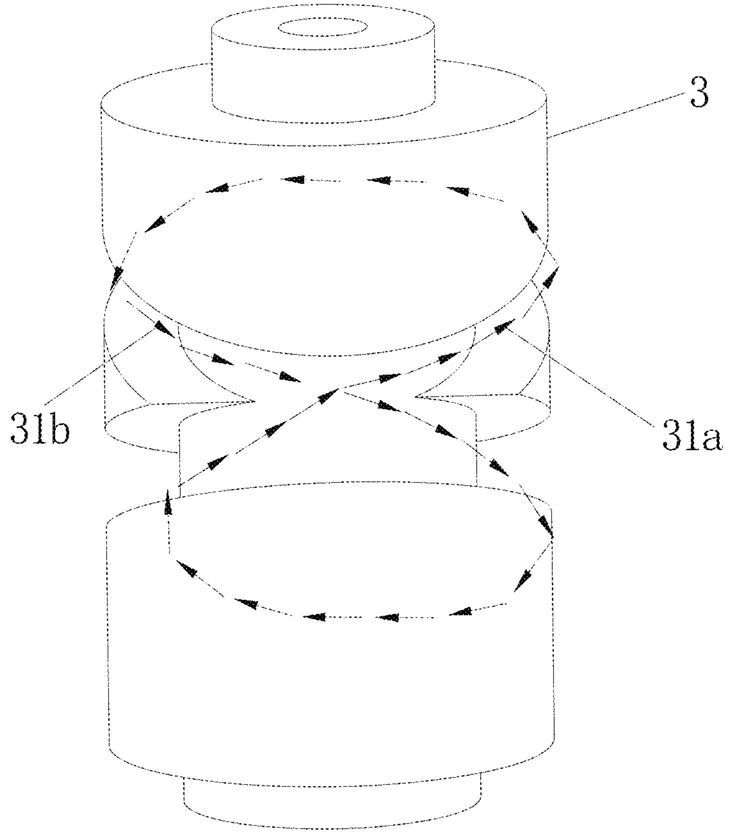
FIG. 6 is a schematic view showing the cooperation between the driving seat and a guiding slot.
Figure 7:
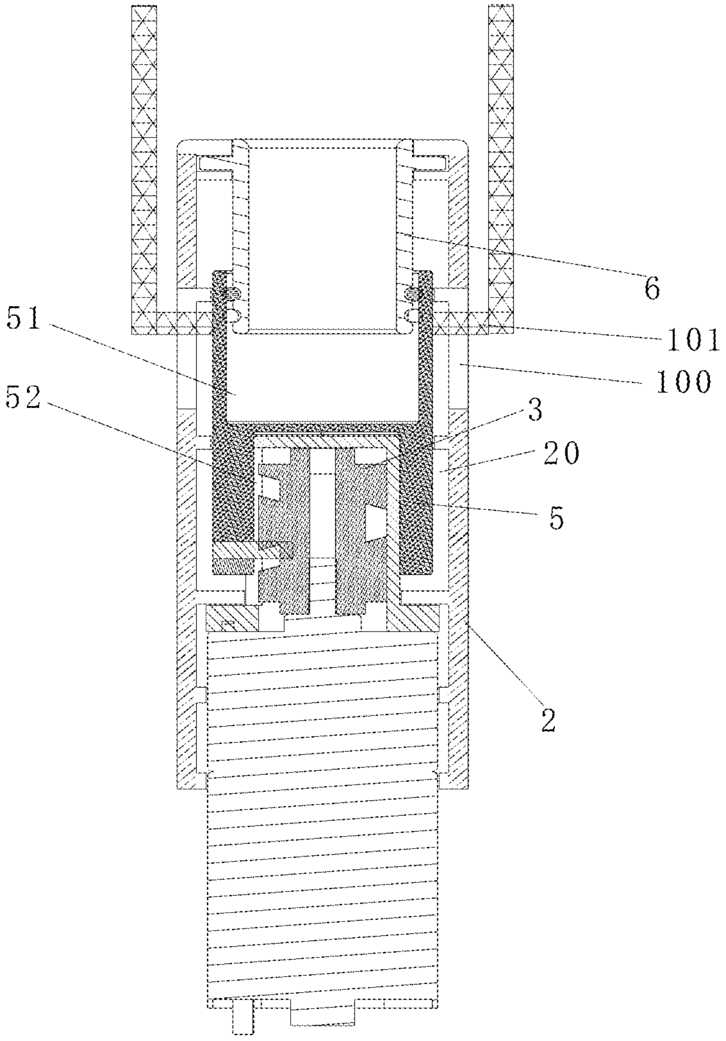
FIG. 7 is a schematic view showing that telescopic portions extend from a telescopic seat.
Figure 8:
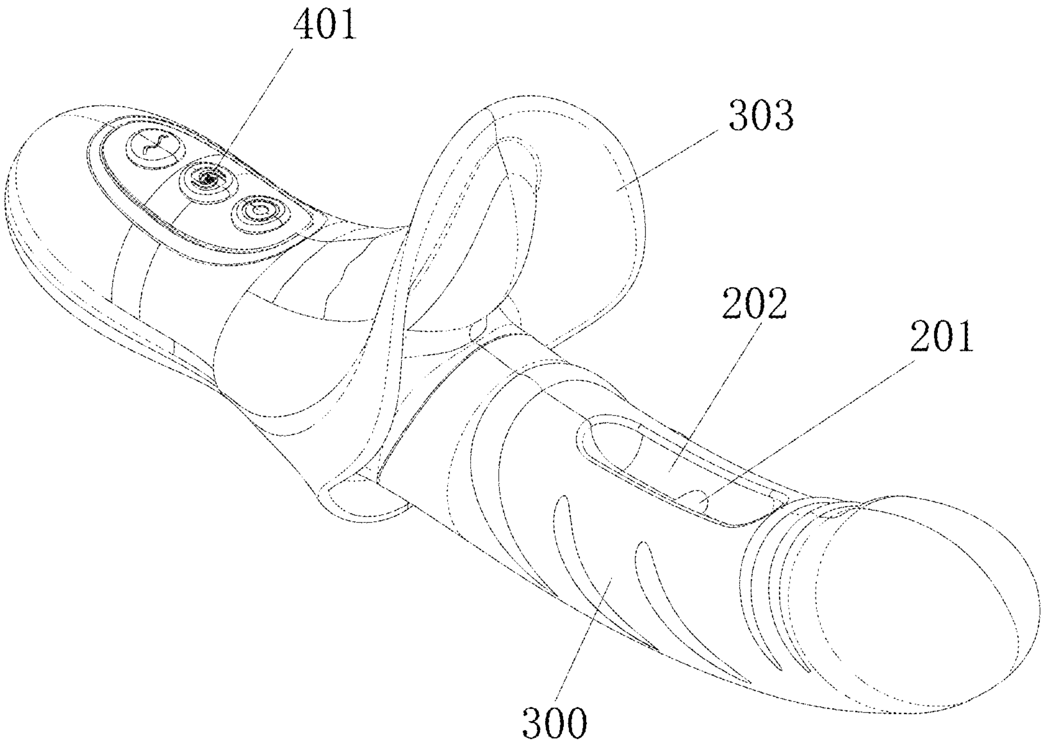
FIG. 8 is a perspective view of a flexible patting rod.
Figure 9:
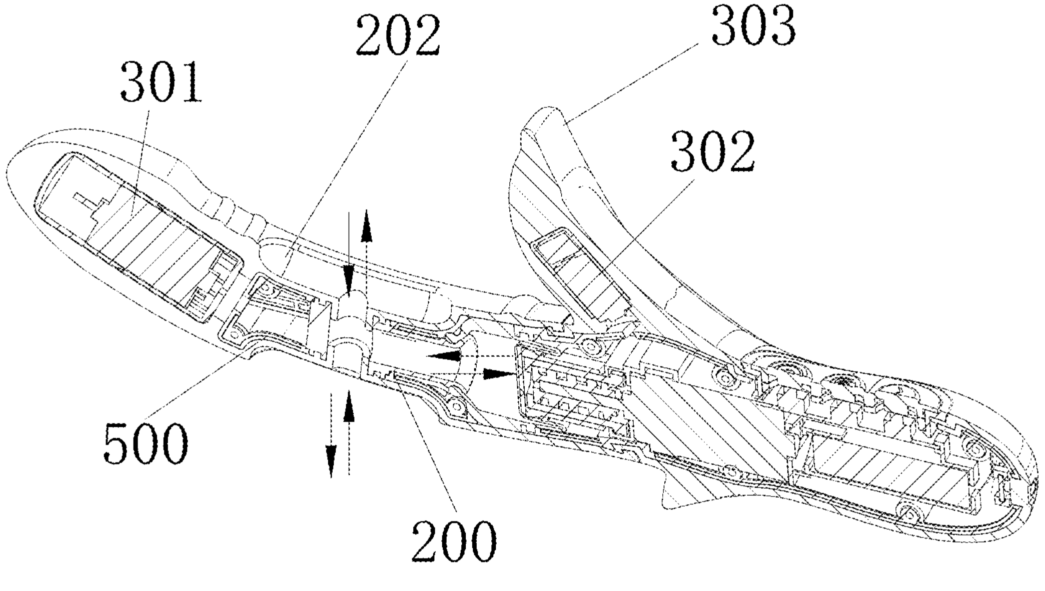
FIG. 9 is a cross-sectional view of the flexible patting rod.
Figure 10:
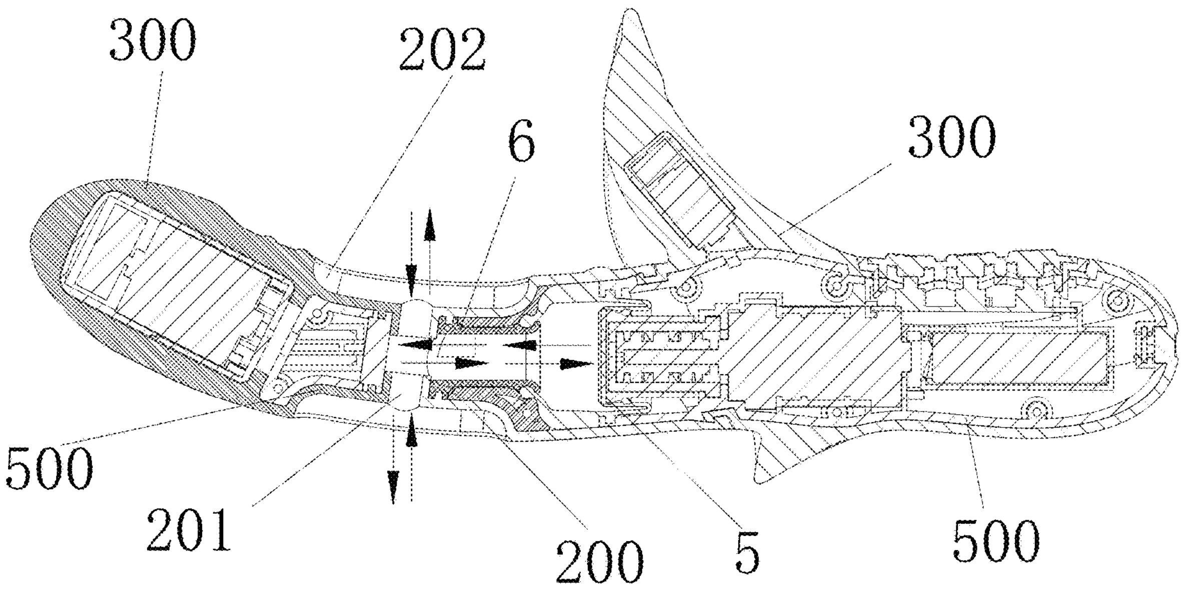
FIG. 10 is a semi-sectional view of the flexible patting rod.
Figure 11:
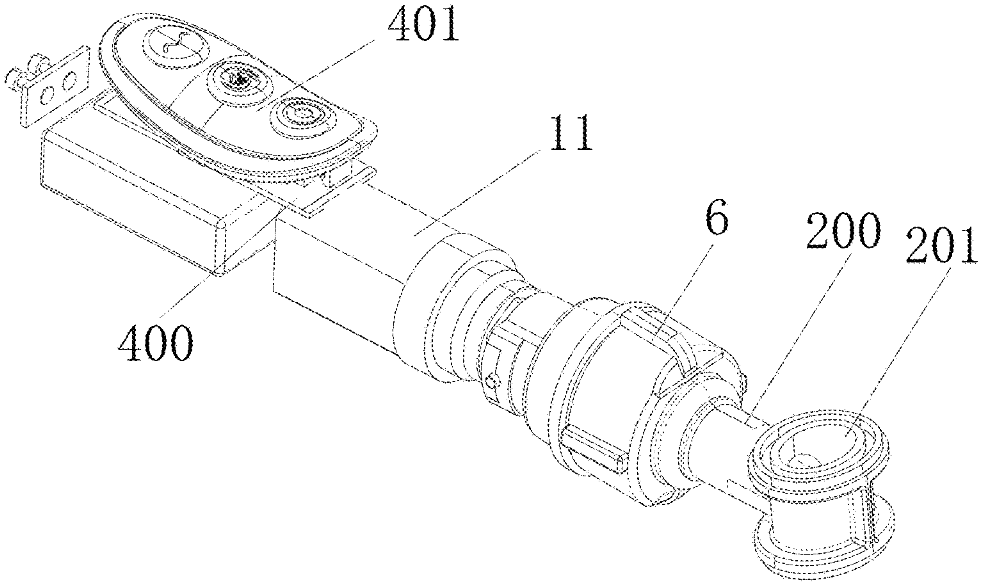
FIG. 11 is a schematic view with a rigid housing and a soft housing hidden.

As shown in FIGS. 1-11, an airflow-driven flexible-patting massage rod structure is provided, wherein the structure includes a rigid housing 500, a flexible sleeve, and a driving device;

the rigid housing 500 is provided with an inner cavity 40, an upper portion of the rigid housing 500 is provided with a flow diversion pipe 200, the rigid housing 500 is provided with at least one recess, wherein the recess is provided with a flow diversion port 201, and the flow diversion pipe 200 is in communication with the flow diversion port 201;

the flexible sleeve covers a peripheral wall of the rigid housing 500, the flexible sleeve covers the recess and forms an elastic portion, and the elastic portion and the rigid housing 500 enclose a flow diversion cavity;

the driving device is disposed on the rigid housing 500, the rigid housing 500 is provided with a lithium battery, a PCB 400 connected to the lithium battery, and a control device 401 connected to the PCB 400, the driving device is connected to the PCB 400, and the control device 401 is configured to control an operating state of the driving device;

the driving device includes a rotating device 1, a driving seat 3, a guiding seat 4, a telescopic seat 5, and a sealing seat 6;

the rotating device 1 is provided with a driving shaft 10, the rotating device 1 is provided with a positioning shell 2 extending upward, the positioning shell 2 is fixed to the rigid housing 500, the positioning shell 2 extends upward from a wall surface of the rotating device 1, the positioning shell 2 is located on an outer wall of the rotating device 1, and the positioning shell 2 and an upper wall of the rotating device 1 enclose a positioning cavity 20;

the guiding seat 4 is fixedly mounted between the positioning shell 2 and the rotating device 1, the guiding seat 4 is provided with the inner cavity 40, the driving seat 3 is disposed in the inner cavity 40, and the guiding seat 4 is provided with a second guiding slot 41 extending along a height direction of the guide seat 4;

the telescopic seat 5 is provided with a lower chamber 52, the guiding seat 4 is disposed in the lower chamber 52, the telescopic seat 5 is provided with a pivotally disposed swing pin 7 in the lower chamber 52, an end portion of the swing pin 7 passes through the second guiding slot 41 and then engages within an arc-shaped slot, and an upper wall of the telescopic seat 5 is further provided with an upper chamber 51;

the sealing seat 6 is fixedly disposed at a rear end of the flow diversion pipe 200, such that the flow diversion cavity is in communication with a sealing cavity 60;

when the rotating device 1 rotates, the arc-shaped slot drives the swing pin 7 to slide along a height direction of the second guiding slot 41;

the sliding of the swing pin 7 drives the telescopic seat 5 to move vertically between a position close to the sealing seat 6 and a position away from the sealing seat 6;

the vertical movement of the telescopic seat 5 causes a gas pressure between the upper chamber 51 and the sealing cavity 60 to switch between compression and release and adjusts a gas pressure of the flow diversion cavity; and when the gas pressure of the flow diversion cavity changes, the elastic portion deforms between an expanded position and a retracted position.

In practical design, the structure includes a positioning shell 2, a drive assembly (a rotating device 1, a driving seat 3, a guiding seat 4, and a telescopic seat 5), and a piston assembly (an upper chamber 51 of the telescopic seat 5 and a sealing seat 6); with the positioning shell 2 as a carrier, the drive assembly and the piston assembly are configured as a modular structure, thereby facilitating installation, production, and assembly, while also providing greater stability and a smaller volume, which facilitates installing this structure within an adult product; through the cooperation between a second guiding slot 41 and an arc-shaped slot, a rotary stroke is converted into a vertical stroke, thereby driving vertical movement of the upper chamber 51; the vertical movement of the upper chamber 51 switches an air pressure between the sealing cavity 60 and the upper chamber 51 between compression and release, thereby achieving switching between positive and negative air pressure; furthermore, the switching process is more linear; this more linear switching process therefore provides a more linear drive to structures such as a flexible patting cup, thereby improving the simulation of the human body's flexible patting process, reducing issues such as jamming, and enhancing the user experience.

Specifically, the rotating device 1 is a rotating motor 11 or a combination of a rotating motor 11 and a speed reduction device 12. Depending on the designed frequency, a stand-alone rotating motor 11 or a combination of the rotating motor 11 and the speed reduction device (also referred to as a gearbox) can be employed.

Specifically, a middle portion of the rotating motor 11 has a non-circular structure, the positioning shell 2 is composed of two half-shells, and the positioning cavity 20 is provided with a profiled cavity at a location corresponding to the rotating motor 11 and engages with the rotating motor 11.

Specifically, the two half-shells are fixed by a first screw, by a snap-fit structure, or by ultrasonic welding.

Specifically, an upper end of an inner wall of the positioning cavity 20 extends inward to form two spaced-apart first limiting portions 81*a*, the two first limiting portions 81*a* enclose a first limiting groove 81*b*, an upper end of the sealing seat 6 is provided with a first engaging portion 81*c* configured to cooperate with the first limiting groove 81*b*, and the first engaging portion 81*c* extends into the first limiting groove 81*b*. This configuration further enables the installation and fixation of the sealing seat 6, allowing this basic structure to be configured as an integrated module, which facilitates installation within a sexual aid product.

Specifically, a middle portion of the positioning shell 2 is provided with an inwardly extending second limiting portion 82*a*, the second limiting portion 82*a* and the upper wall of the rotating device 1 enclose a second limiting groove 82*b*, and the guiding seat 4 is provided with a second engaging portion 82*c* configured to cooperate with the second limiting groove 82*b*.

Specifically, the second engaging portion 82*c* is fixed to an upper wall of the rotating motor 11 by a second screw. The configuration of the positioning shell 2 and the second screw facilitates limiting the position of the guiding seat 4, reduces the reaction force generated during movement of the swing pin 7, and improves operational stability.

Specifically, the driving shaft 10 has a non-circular structure, and the driving seat 3 is provided with a non-circular shaft slot 32 configured to cooperate with the driving shaft 10.

Specifically, a first guiding slot 30 is composed of two mirror-symmetrical ring-shaped slots 31, an intersection region is provided between the two ring-shaped slots 31, and the two ring-shaped slots 31 form an upward channel 31*a* and a downward channel 31*b*. The swing pin 7 is configured to follow a contour and swing within the ring-shaped slots 31. The swing pin 7 first enters the upward channel 31*a* and then moves toward the downward channel 31*b* at a top portion of each of the ring-shaped slots 31. This sequence enables the swing pin 7 to achieve vertical movement through the cooperation between the swing pin's 7 pivoting structure and the ring-shaped slots 31.

Specifically, the telescopic seat 5 is provided with a pivoting hole 70, the swing pin 7 includes a pivoting shaft 71 and an arc-shaped portion 72 provided at an end portion of the pivoting shaft 71, the pivoting shaft 71 is disposed in the pivoting hole 70 and rotates with swinging of the arc-shaped portion 72, and the arc-shaped portion 72 matches an arc of the first guiding slot 30. This configuration further enables the arc-shaped portion 72 to move along a length direction of the first guiding slot 30, thereby achieving vertical movement of the telescopic seat 5.

Specifically, an outer wall of a lower end of the telescopic seat 5 is provided with a notch 73, the notch 73 is provided with a positioning portion 74, the positioning portion 74 and the notch 73 are respectively provided with a half-hole, and the two half-holes enclose the pivoting hole 70. This configuration not only facilitates containing the swing pin 7 but also simplifies its installation.

Specifically, the arc-shaped portion 72 extends arcuately and symmetrically from the end portion of the pivoting shaft 71.

Specifically, an inner wall of the inner cavity 40 and an outer wall of the telescopic seat 5 have similar shapes and are hexagonal, thereby achieving a guiding function and ensuring stable vertical movement of the telescopic seat 5.

Specifically, an outer wall of a lower portion of the sealing seat 6 is provided with a groove 202, the groove 202 is provided with a sealing ring 61, an end portion of the sealing ring 61 protrudes from the outer wall of the sealing seat 6, and an inner wall of the upper chamber 51 abuts against an end wall of the sealing ring 61. This configuration enables the air pressure within the sealing cavity 60 to be switched.

Specifically, an upper end of the sealing cavity 60 is provided with an opening 62 or a connecting hole. Depending on the product in which it is used, the upper end of the sealing cavity 60 can be provided with the opening 62, for example, for use with a flexible patting cup. When used in a driving mechanism, the connecting hole can be provided to connect directly to a conduit. The fixedly arranged sealing seat 6 also obviates the need for an additional fixation structure on the product's housing, facilitating use and avoiding interference that may occur during movement of the sealing seat 6.

Specifically, at least one sealing ring 61 is provided.

Specifically, an upper end wall of the positioning shell 2 is provided with an inwardly extending blocking portion 91, the blocking portion 91 is flush with an upper end wall of the sealing seat 6, and the upper end wall of the sealing seat 6 is provided with an inner chamfer 92.

Specifically, an outer wall of the positioning shell 2 is provided with at least two guide holes 100 distributed along a height direction of the positioning shell 2, each of the guide holes 100 penetrates a side wall of the positioning shell 2, each of the guide holes 100 is provided with a telescopic portion 101, and the telescopic portion 101 passes through the respective one of the guide holes 100 and is fixed to the outer wall of the telescopic seat 5.

Specifically, the telescopic portion 101 extends upward and protrudes from an upper wall of the positioning shell 2. This configuration ensures flexible patting while also providing a telescopic driving function, enabling a single core mechanism to achieve a dual-drive structure.

Specifically, the telescopic portion 101 extends radially and protrudes from a wall surface of the positioning shell 2. In this state, this structure can act on a silicone pad, thereby functioning as a caressing action on an outer wall of the sexual aid product, and consequently achieving a different dual-drive structure.

A cross-section of the telescopic seat 5 along a height direction is "H"-shaped. This structural configuration facilitates assembly of the air pump.

The flexible sleeve is a condom or a flexible sleeve integrally formed with the rigid housing 500.

The flexible sleeve is detachably disposed, and an outer wall of the flexible sleeve is either smooth, provided with concave-convex particles, or provided with concave-convex stripes, thereby satisfying predetermined stimulation requirements or simulating the design of a male penis. For example, the outer wall of the flexible sleeve may imitate the veins of a male penis to achieve predetermined stimulation requirements.

A terminal end of the flow diversion pipe 200 is provided with two radially symmetrically disposed flow diversion ports 201. Of course, the number of specific flow diversion ports 201 can also be two or three. For instance, arranging the flow diversion ports 201 at the terminal end simulates expansion and contraction of a glans, providing a more comprehensive experience.

A peripheral wall of the rigid housing 500 is covered with a soft rubber shell, and a front end of the soft rubber shell is provided with a first vibration motor 301.

A side wing 303 extends from a rear portion of the soft rubber shell, and the side wing 303 is provided with a second vibration motor 302. The second vibration motor 302 is configured to provide stimulation to the clitoris. This configuration thereby achieves simulated stimulation of expansion, the glans, and the clitoris, consequently enhancing the product's diversity of experience.

The side wing 303 is arc-shaped, thereby providing a larger contact area with the clitoris.

The above descriptions are only preferred embodiments of the present disclosure and are not intended to limit the patent scope of the present disclosure, and any equivalent structural transformation made by the description and drawings of the present disclosure or direct/indirect application in other related technical fields is included in the patent protection scope of the present disclosure under the inventive concept of the present disclosure.

What is claimed is:

1. An airflow-driven flexible-patting massage rod structure, comprising:

a rigid housing, wherein the rigid housing is provided with an inner cavity, an upper portion of the rigid housing is provided with a flow diversion pipe, the rigid housing is provided with at least one recess, wherein the at least one recess is provided with a flow diversion port, and the flow diversion pipe is in communication with the flow diversion port;

a flexible sleeve, wherein the flexible sleeve covers a peripheral wall of the rigid housing, the flexible sleeve covers the at least one recess and forms an elastic portion, and the elastic portion and the rigid housing enclose a flow diversion cavity;

a driving device, wherein the driving device is disposed on the rigid housing, the rigid housing is provided with a lithium battery, a Printed Circuit Board (PCB) connected to the lithium battery, and a control device connected to the PCB, the driving device is connected to the PCB, and the control device is configured to control an operating state of the driving device;

wherein the driving device comprises a rotating device, a driving seat, a guiding seat, a telescopic seat, and a sealing seat;

wherein the rotating device is provided with a driving shaft, the rotating device is provided with a positioning shell extending upward, the positioning shell is fixed to the rigid housing, the positioning shell extends upward from a wall surface of the rotating device, the positioning shell is located on an outer wall of the rotating device, and the positioning shell and an upper wall of the rotating device enclose a positioning cavity;

wherein the guiding seat is fixedly mounted between the positioning shell and the rotating device, the guiding seat is provided with the inner cavity, the driving seat is disposed in the inner cavity, and the guiding seat is provided with a first guiding slot extending along a height direction of the guide seat;

wherein the telescopic seat is provided with a lower chamber, the guiding seat is disposed in the lower chamber, the telescopic seat is provided with a pivotally disposed swing pin in the lower chamber, an end portion of the swing pin passes through the first guiding slot and then engages within an arc-shaped slot, and an upper wall of the telescopic seat is further provided with an upper chamber;

wherein the sealing seat is fixedly disposed at a rear end of the flow diversion pipe, such that the flow diversion cavity is in communication with a sealing cavity;

wherein when the rotating device rotates, the arc-shaped slot drives the swing pin to slide along a height direction of the first guiding slot;

the sliding of the swing pin drives the telescopic seat to move vertically between a position close to the sealing seat and a position away from the sealing seat;

the vertical movement of the telescopic seat causes a gas pressure between the upper chamber and the sealing cavity to switch between compression and release and adjusts a gas pressure of the flow diversion cavity; and when the gas pressure of the flow diversion cavity changes, the elastic portion deforms between an expanded position and a retracted position.

2. The airflow-driven flexible-patting massage rod structure according to claim 1, wherein the rotating device is a rotating motor or a combination of a rotating motor and gearbox;

a middle portion of the rotating motor has a non-circular structure, the positioning shell is composed of two half-shells, and the positioning cavity is provided with a profiled cavity at a location corresponding to the rotating motor and engages with the rotating motor; and the two half-shells are fixed by a first screw, by a snap-fit structure, or by ultrasonic welding.

3. The airflow-driven flexible-patting massage rod structure according to claim 1, wherein an upper end of an inner wall of the positioning cavity extends inward to form two spaced-apart first limiting portions, the two first limiting portions enclose a first limiting groove, an upper end of the sealing seat is provided with a first engaging portion configured to cooperate with the first limiting groove, and the first engaging portion extends into the first limiting groove.

4. The airflow-driven flexible-patting massage rod structure according to claim 3, wherein a middle portion of the positioning shell is provided with an inwardly extending second limiting portion, the second limiting portion and the upper wall of the rotating device enclose a second limiting groove, and the guiding seat is provided with a second engaging portion configured to cooperate with the second limiting groove; and the second engaging portion is fixed to an upper wall of the rotating motor by a second screw.

5. The airflow-driven flexible-patting massage rod structure according to claim 1, wherein the driving shaft has a non-circular structure, and the driving seat is provided with a non-circular shaft slot configured to cooperate with the driving shaft.

6. The airflow-driven flexible-patting massage rod structure according to claim 1, wherein a second guiding slot is composed of two mirror-symmetrical ring-shaped slots, an intersection region is provided between the two ring-shaped slots, and the two ring-shaped slots form an upward channel and a downward channel.

7. The airflow-driven flexible-patting massage rod structure according to claim 6, wherein the telescopic seat is provided with a pivoting hole, the swing pin comprises a pivoting shaft and an arc-shaped portion provided at an end portion of the pivoting shaft, the pivoting shaft is disposed in the pivoting hole and rotates with swinging of the arc-shaped portion, and the arc-shaped portion matches an arc of the second guiding slot.

8. The airflow-driven flexible-patting massage rod structure according to claim 7, wherein the arc-shaped portion extends arcuately and symmetrically from the end portion of the pivoting shaft.

9. The airflow-driven flexible-patting massage rod structure according to claim 1, wherein an outer wall of a lower end of the telescopic seat is provided with a notch, the notch is provided with a positioning portion, the positioning portion and the notch are respectively provided with a half-hole, and the two half-holes enclose the pivoting hole.

10. The airflow-driven flexible-patting massage rod structure according to claim 1, wherein an inner wall of the inner cavity and an outer wall of the telescopic seat have similar shapes and are hexagonal.

11. The airflow-driven flexible-patting massage rod structure according to claim 1, wherein an outer wall of a lower portion of the sealing seat is provided with a groove, the groove is provided with a sealing ring, an end portion of the sealing ring protrudes from the outer wall of the sealing seat, and an inner wall of the upper chamber abuts against an end wall of the sealing ring.

12. The airflow-driven flexible-patting massage rod structure according to claim 11, wherein an upper end of the sealing cavity is provided with an opening or a connecting hole.

13. The airflow-driven flexible-patting massage rod structure according to claim 1, wherein at least one sealing ring is provided.

14. The airflow-driven flexible-patting massage rod structure according to claim 1, wherein an upper end wall of the positioning shell is provided with an inwardly extending blocking portion, the blocking portion is flush with an upper end wall of the sealing seat, and the upper end wall of the sealing seat is provided with an inner chamfer.

15. The airflow-driven flexible-patting massage rod structure according to claim 1, wherein an outer wall of the positioning shell is provided with at least two guide holes distributed along a height direction of the positioning shell, each of the guide holes penetrates a side wall of the positioning shell, each of the guide holes is provided with a telescopic portion, and each telescopic portion passes through the respective one of the guide holes and is fixed to an outer wall of the telescopic seat.

16. The airflow-driven flexible-patting massage rod structure according to claim 15, wherein each telescopic portion extends upward and protrudes from an upper wall of the positioning shell;

each telescopic portion extends radially and protrudes from a wall surface of the positioning shell; and a cross-section of the telescopic seat along a height direction is "H"-shaped.

17. The airflow-driven flexible-patting massage rod structure according to claim 1, wherein the flexible sleeve is a condom; and the flexible sleeve is detachably disposed, and an outer wall of the flexible sleeve is either smooth, provided with concave-convex particles, or provided with concave-convex stripes.

18. The airflow-driven flexible-patting massage rod structure according to claim 1, wherein a terminal end of the flow diversion pipe is provided with two of the flow diversion ports disposed in radial symmetry.

19. The airflow-driven flexible-patting massage rod structure according to claim 1, wherein a peripheral wall of the rigid housing is covered with a soft rubber shell, and a front end of the soft rubber shell is provided with a first vibration motor.

20. The airflow-driven flexible-patting massage rod structure according to claim 1, wherein a side wing extends from a rear portion of a soft rubber shell, and the side wing is provided with a first vibration motor.

* * * * *